H. A. ANDERSON.
DEAD BIRD DECOY HOLDER.
APPLICATION FILED NOV. 22, 1918.
1,299,896.
Patented Apr. 8, 1919.
2 SHEETS—SHEET 2.
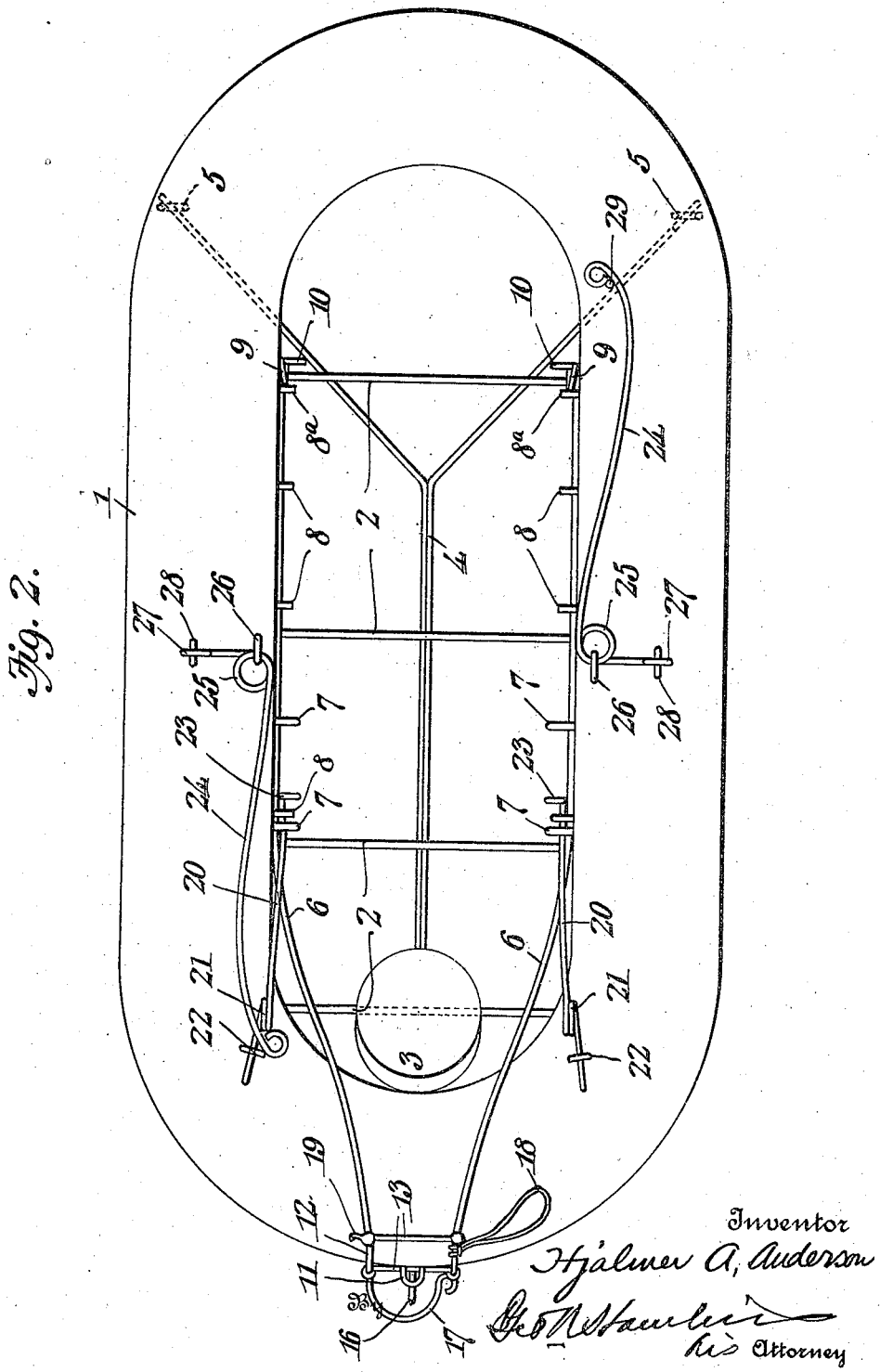

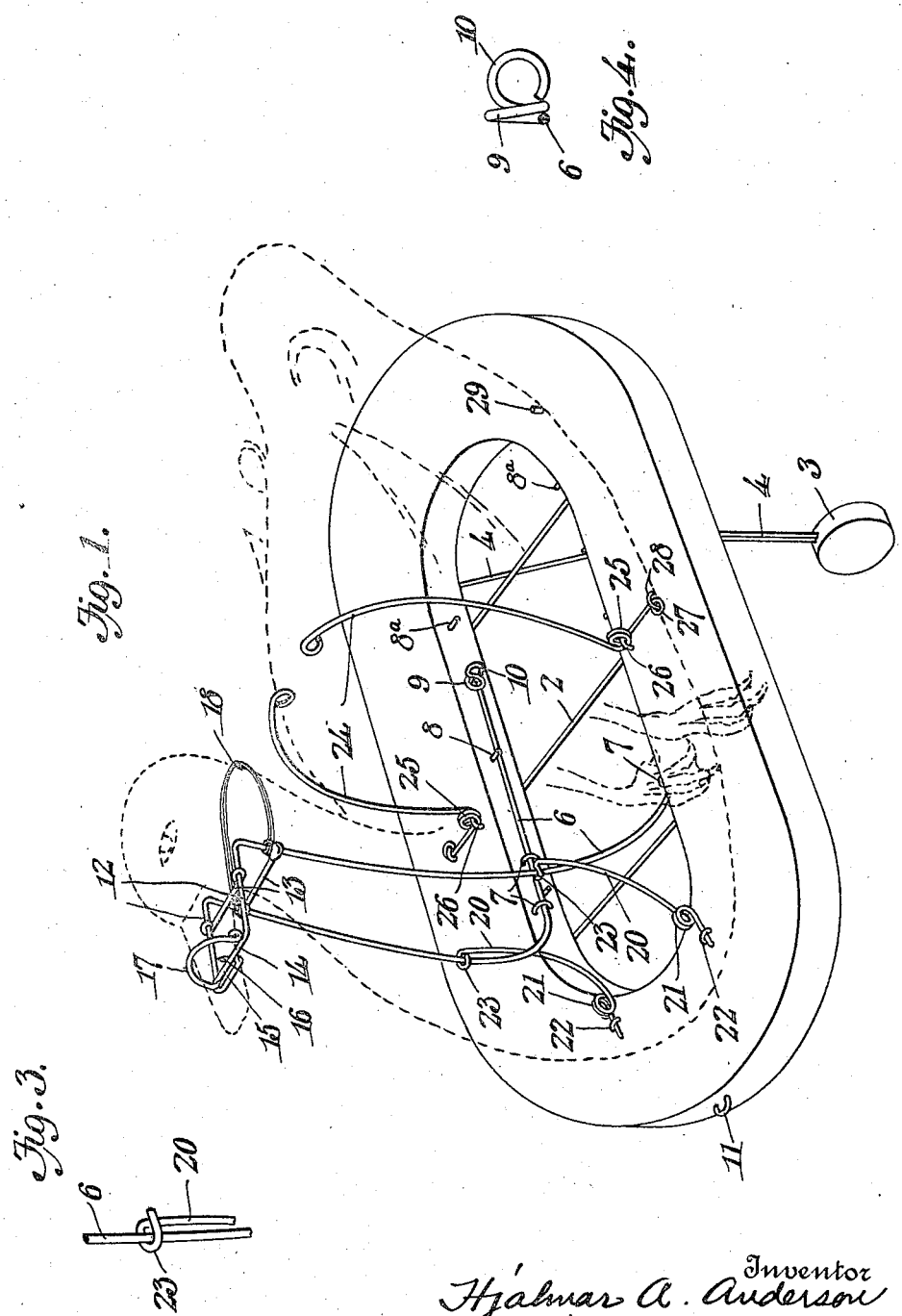

UNITED STATES PATENT OFFICE.

HJALMAR A. ANDERSON, OF GARFIELD TOWNSHIP, SIOUX COUNTY, IOWA.

DEAD-BIRD-DECOY HOLDER.

1,299,896.     Specification of Letters Patent.     Patented Apr. 8, 1919.

Application filed November 22, 1918. Serial No. 263,787.

*To all whom it may concern:*

Be it known that I, HJALMAR A. ANDERSON, a citizen of the United States, residing at Garfield township, in the county of Sioux and State of Iowa, have invented certain new and useful Improvements in Dead-Bird-Decoy Holders, of which the following is a specification.

This invention relates to those devices which are employed for holding dead water fowl, ducks for instance, in a natural position on the water to serve as decoys. Having shot his first bird, the hunter affixes it to the holder and lets it float on the water.

My object is to provide a dead bird decoy holder which will be adapted to fold into relatively compact position so that it will be readily carried about by the hunter, or transferred from place to place; further, one which will be of such improved construction that it can be adjusted to birds of different sizes and species, enabling the same holder to be used for hunting different species of birds, thereby obviating the necessity of providing imitation decoys for all the different species which the hunter may believe he will encounter when out shooting.

A further object of the invention is the provision of a dead bird decoy holder which will retain the body, neck, and head of the bird in life-like and natural position, and will have exceptionally good balancing capacity so that the holder and the bird will float in such a manner as to deceive live birds.

The embodiment of the invention which is illustrated in the drawings may be used for holding any water fowl. A given size will be used for ducks and a larger size for geese and brant.

I am aware that changes might be resorted to in carrying out the invention and in effecting the adjustments and securement of the different birds. I do not, therefore, restrict myself to the details hereinafter described, or which are shown in the accompanying drawings. The disclosure is to be considered illustrative, rather than restrictive, of the scope of the invention.

In the accompanying drawings,

Figure 1 is a perspective view of the holder, set up for use, a dead bird being represented by dotted lines;

Fig. 2, is a plan view of the holder, the parts being folded;

Fig. 3, a detail view, showing one of the spring hooks engaged with one of the frame wires; and Fig. 4, a detail view of one of the locking finger pieces of the spring frame wires.

The holder has a float 1, preferably of wood, which is of elongated and open form, enabling the body of the duck, or other bird, to be accommodated therein and to rest upon cross wires or pieces 2.

To hold the float steady and in properly balanced position when the bird is supported thereon, there is provided a weight 3 suspended by wires 4 which are hinged to the rear end of the float at 5. When the float is placed in the water the weight is suspended therefrom, but the weight and the wires can be folded against the bottom of the float as shown in Fig. 2.

To enable the hunter to employ the same holder in connection with birds of different sizes and species, I provide adjustable neck and bill holding means adapted for extension longitudinally of the float 1. This device comprises a frame composed of spring wires 6 running through and slidable in eyes or staples 7 on the float 1, studs 8 located at different points of the length of the float at the margin of the cut out central portion thereof, which are adapted to receive the eyes 9 on the wires. The wires have finger pieces 10 enabling the eyes to be snapped onto or off the studs 8. The resiliency of the wires 6 causes the eyes 9 to remain on the studs 8 when the holder is in form for being carried about, the wires 6 will be shifted toward the rear of the float and the eyes 9 engaged with the rearmost studs 8ª. The bill and head holding part of the bird holder will then be engaged with a stud or staple 11, as shown in Fig. 2.

The bill and head holding part comprises portions 12 which are at an angle to the curved wires 6 and are connected by cross braces 13, and a bill support 14 which has a loop 15 terminating in a prong 16, constituting a continuation of one of the wires 6. The other wire 6 extends loosely through the loop 15 and thence upwardly in the form of a spring clip 17 which is adapted to snap down on top of the bill of the bird so that, with the prong 16 penetrating the under side of the bill and the spring clip pressing down on the top of the bill, the bill and the head will be securely retained in life-like and natural position. To hold the neck of the bird in position, a rubber band or elastic loop 18 is provided which is secured to one of the wires 6 and is adapted to snap over the projection 19 on one of the braces 13.

To hold the wires 6 in raised position and cause the neck and breast of the bird to be suitably raised and the head and bill properly positioned, spring hooks 20 provided with coils 21 and anchored to the float at 22, are provided. The hooks 23 engage the wires 6 but may be readily disconnected therefrom to permit folding of the parts.

To hold the body of the bird down on the cross wires 2 and seated properly within the open portion of the float 1, there are provided arched spring holders or wires 24 which have coils 25 loosely arranged on staples 26 on the float 1. The ends of these wires or holders are provided with eyes 27 which are loosely engaged with staples 28 on the float. By reason of the loose arrangement described, the holding wires 24 may be arranged in folded position on top of the float 1 and engage with a stud 29, in one instance, and the coil 21 in the other instance, or, they may be raised up and allowed to press down on the top of the body of the bird, which they will do by reason of the provision of the coils 25 and the inherent resiliency of the wires 24.

What I claim is:

1. In a dead bird decoy holder, the combination with a float, of a neck and head holder which is slidably adjustable as an entirety both lengthwise of the float and upwardly in relation thereto to different positions to accommodate birds of different sizes and species.

2. In a dead bird decoy holder, the combination with a float, of neck and head holding means having resilient members slidably connected to the float whereby the neck and head holding means may be adjusted lengthwise of the float and also upwardly in relation thereto to different positions to accommodate birds of different sizes and species.

3. In a dead bird decoy holder, the combination with a float, of neck and head holding means having resilient members slidably connected to the float whereby the neck and head holding means may be adjusted to different positions to accommodate birds of different sizes and species, and securing devices for locking or holding the resilient members where positioned.

4. In a dead bird decoy holder, the combination with a float, of a neck and head holder provided with resilient members secured to the float and adapted to fold down thereupon or be raised up, and releasable supports carried by the float which engage the resilient members to hold them in raised position.

5. In a dead bird decoy holder, the combination with a float, of a neck and head holder provided with resilient members having a slidable connection to the float, and spring actuated supports provided with hooks adapted to detachably engage the resilient members aforesaid to hold the neck and head holder in raised position.

6. In a dead bird decoy holder, the combination with a float adapted to support the bird, of body holding inherently resilient wires arranged to be folded down lengthwise of the float or raised and engaged with the body of the bird, said wires having a tendency to engage the bird, when they are raised.

7. In a dead bird decoy holder, the combination with a float, of body holding resilient wires having end portions hinged to the float and intermediate coiled portions, eyes on the float with which the coiled portions are loosely engaged, whereby the body holding wires may be folded down on the float or made to engage with the body of the bird to hold it on the float, and means for holding the head of the bird in natural position.

8. In a dead bird decoy holder, a neck, head and bill holding device comprising wires connected by horizontal braces for the head to rest upon and provided with a prong to penetrate the bill and a clip to hold the bill down on the horizontal braces.

9. A dead bird decoy holder comprising a float, foldable body holding wires adapted to be arranged to press upon the back of the bird, a foldable and extensible neck, head and bill holder adapted to be folded down on the float or raised thereabove and extended to accommodate the bird, and foldable braces on the float adapted to hold the neck and head holder in raised position.

In testimony whereof I affix my signature.

HJALMAR A. ANDERSON.